Jan. 11, 1955
J. PERRIN
2,699,210
APPARATUS CONTROLLED BY DATA SENSED FROM STATISTICAL RECORDS
Filed May 9, 1951
6 Sheets-Sheet 1
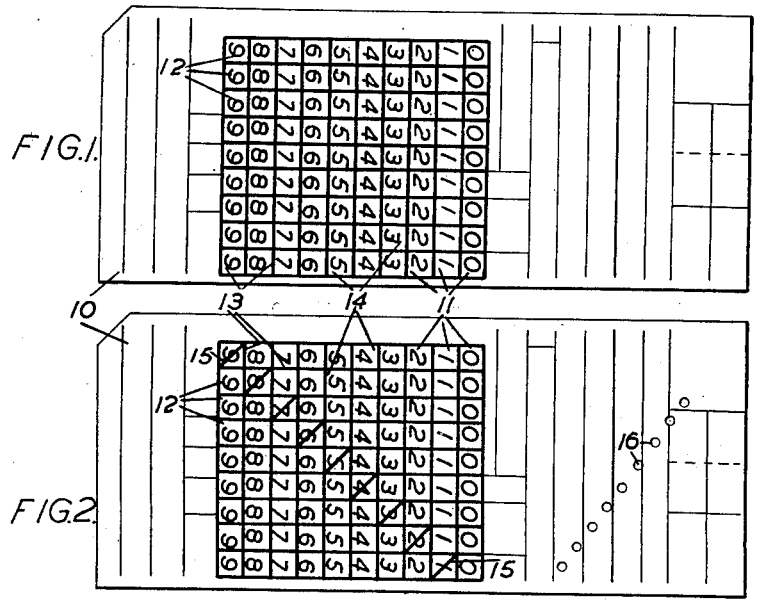
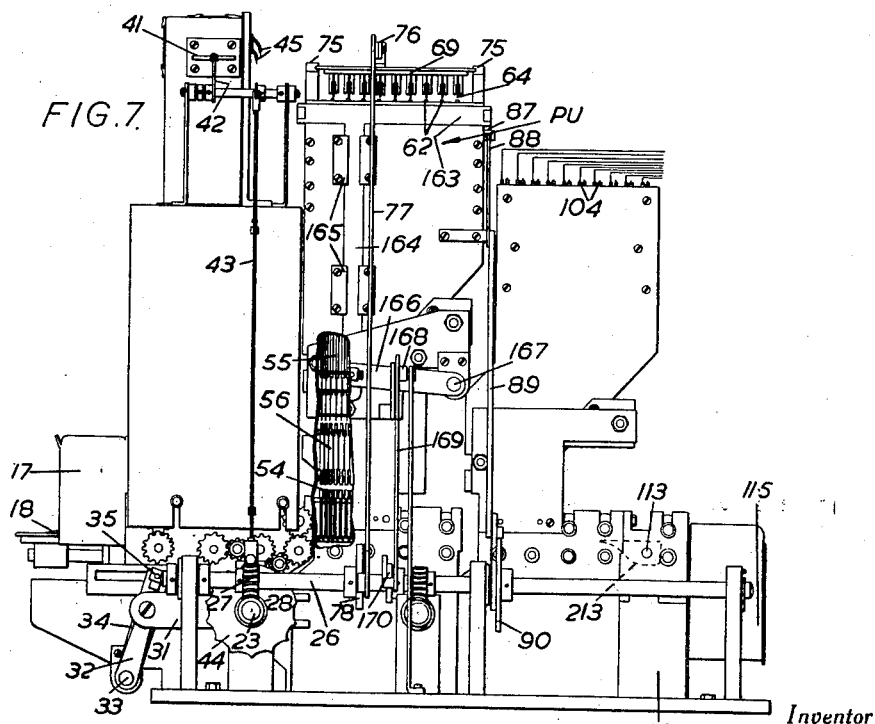
Inventor
John Perrin
By
Attorney

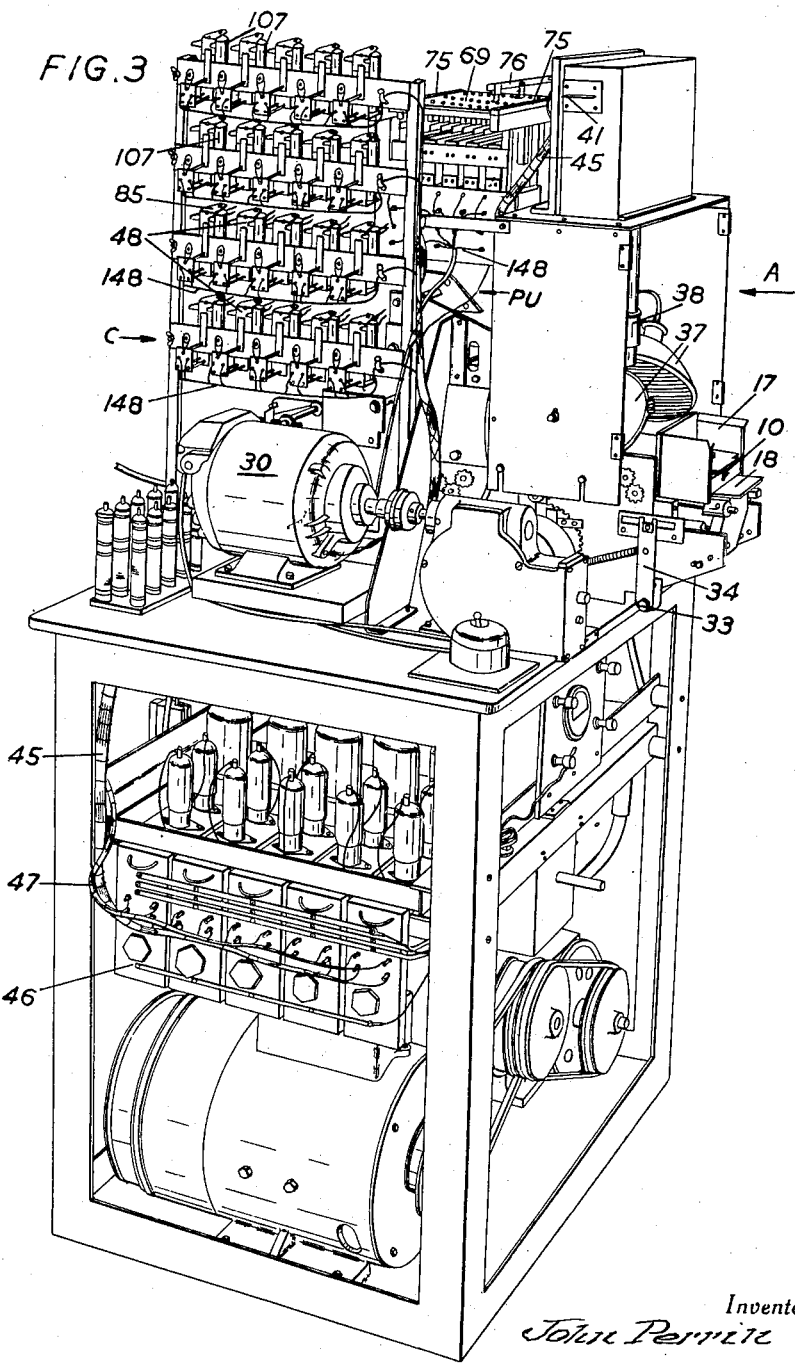

Jan. 11, 1955
J. PERRIN
2,699,210
APPARATUS CONTROLLED BY DATA SENSED
FROM STATISTICAL RECORDS
Filed May 9, 1951
6 Sheets-Sheet 4
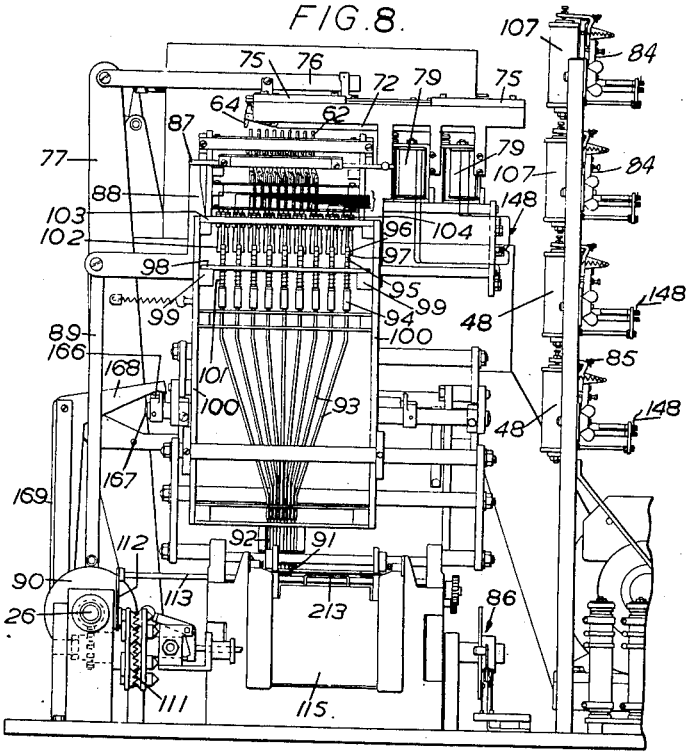
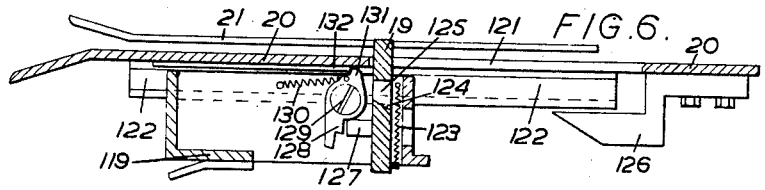
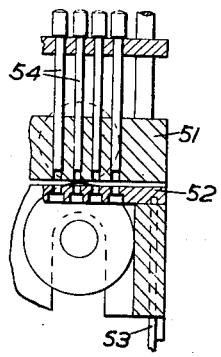
Inventor
John Perrin
By
Attorney

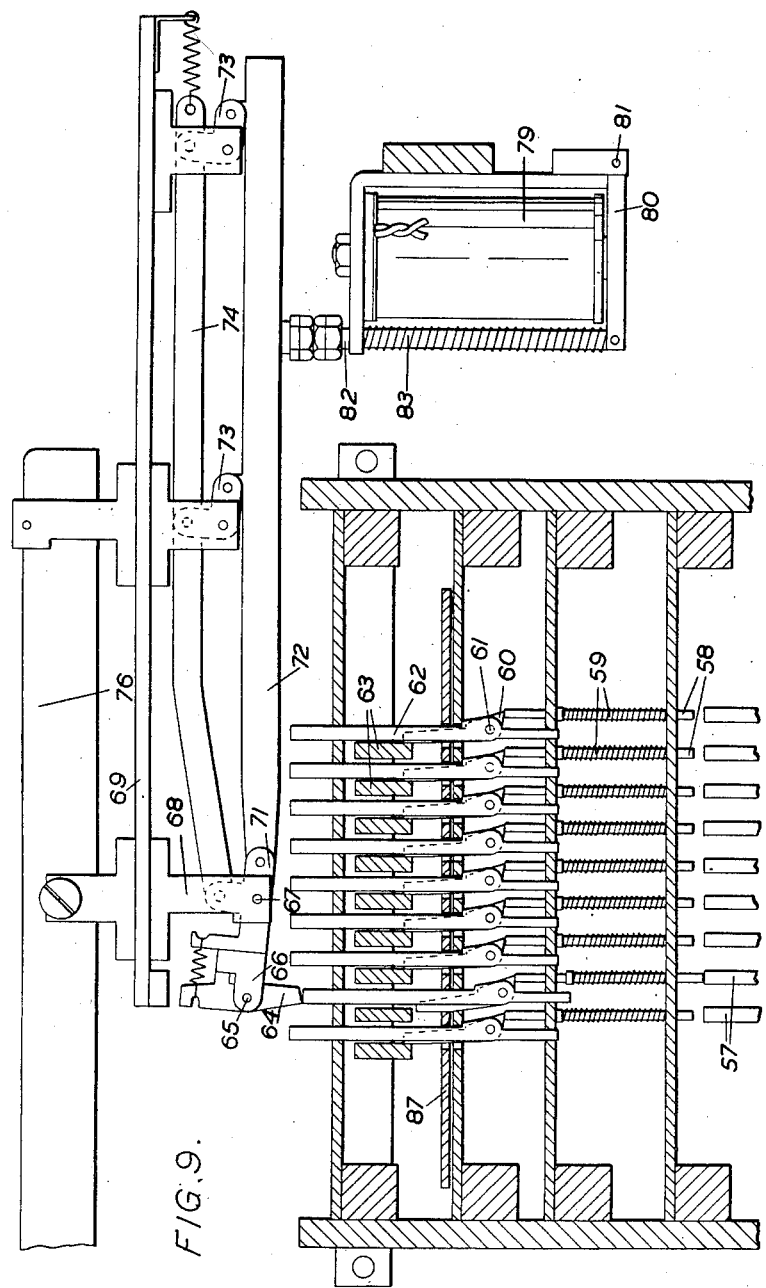

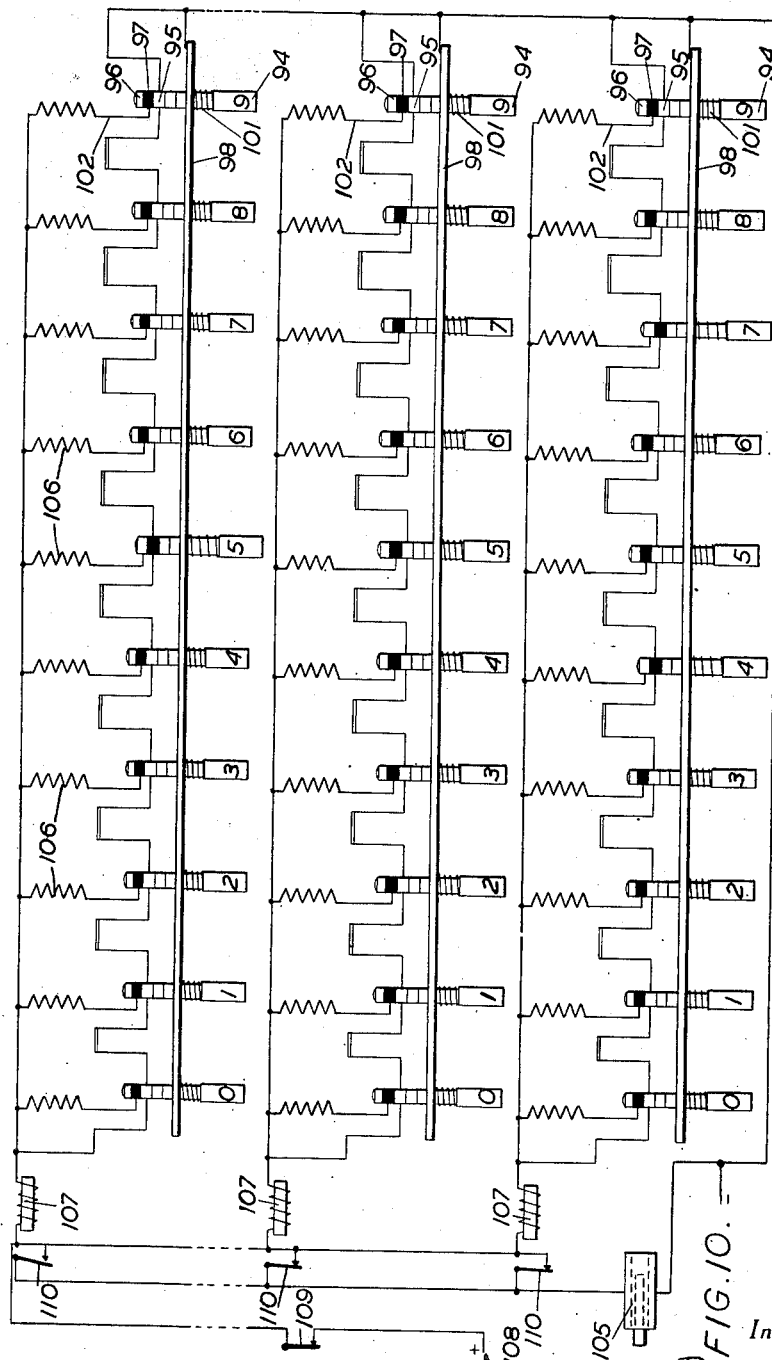

United States Patent Office 2,699,210
Patented Jan. 11, 1955

2,699,210

APPARATUS CONTROLLED BY DATA SENSED FROM STATISTICAL RECORDS

John Perrin, Croydon, England, assignor to Powers-Samas Accounting Machines Limited, London, England, a British company Application May 9, 1951, Serial No. 225,307

Claims priority, application Great Britain May 17, 1950

4 Claims. (Cl. 164—115)

This invention relates to statistical records and to apparatus for sensing data recorded thereon.

It has heretofore been proposed to record data on statistical records by perforations which can be sensed by mechanical, electrical, or photo-electrical means and it has also been proposed to record data on stastical records by applying to the data-indicating positions of a record card narrow strips of electrically conductive or magnetic material which can be sensed by electrical or electro-magnetic sensing means.

It is a main object of the present invention to provide apparatus for sensing data column by column or row by row from a card thereby to condition electric circuits including electro-magnets for controlling the operation of selector fingers operable selectively to effect operation of selector members employed in a record card controlled machine.

Figure 4:
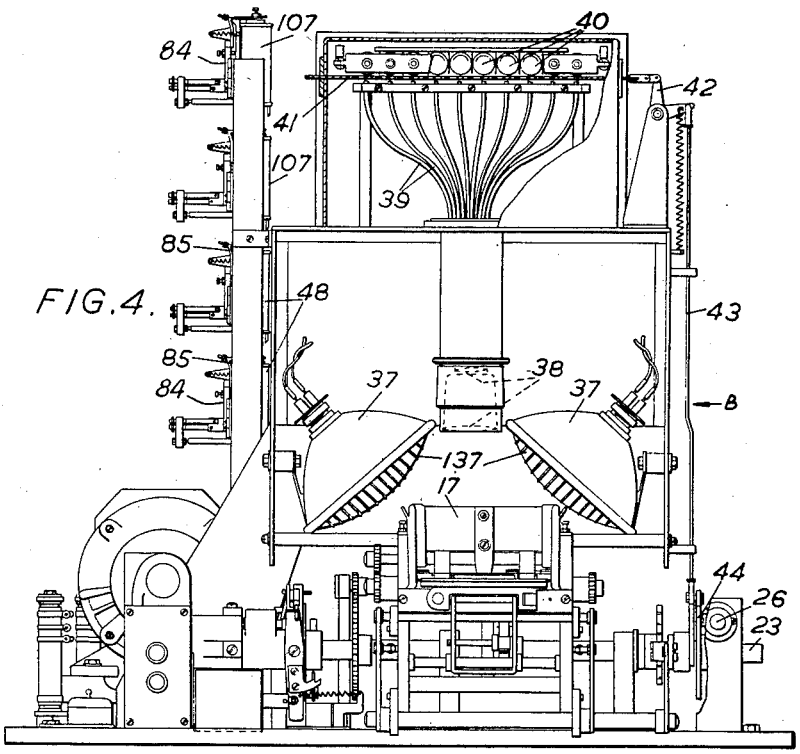
Figure 5:
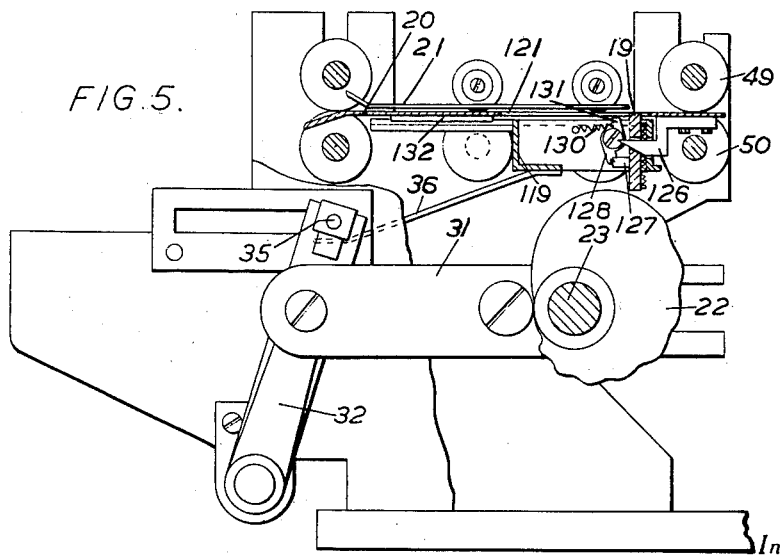

In order that the invention may be more clearly understood an embodiment thereof will now be described, by way of example, with reference to the accompanying diagrammatic drawings in which:

Fig. 1 illustrates one form of statistical record card prepared in accordance with the invention, Fig. 2 shows the card according to Fig. 1 with data indications marked thereon and with punched perforations therein corresponding to the marked data, Fig. 3 is a diagrammatic perspective view, looking from one side and one end, of a machine for scanning or sensing and for punching cards according to Fig. 1, Fig. 4 is an end elevation of the machine looking in the direction of arrow "A", Fig. 3, Fig. 5 is a view of mechanism for locating a card in scanning position, Fig. 6 shows, to an enlarged scale, a part of the mechanism illustrated in Fig. 5, Fig. 7 is a side elevation looking in direction of arrow "B", Fig. 4, Fig. 8 is an end view looking in direction of arrow "C", Fig. 3, Fig. 9 is a section illustrating the punch setting apparatus, Fig. 10 is a circuit diagram illustrating the manner of checking cards after they have passed the punching position, and Fig. 11, to an enlarged scale, illustrates in section a part of the card chamber for punching.

Referring to Figs. 1 and 2 it will be observed that the record card 10 is of well known shape and is provided with data-indicating positions arranged in rows 11 and columns 12. On the cards shown in Figs. 1 and 2 the columns extend lengthwise of the cards and the rows are vertical with respect thereto, this being in contradistinction to the arrangement usually employed on record cards. It will, however, be understood that if desired the columns and rows may be arranged in the manner more usually employed.

The record card is of a colour such that light is reflected from the surface thereof and, as illustrated in Figs. 1 and 2, to the card is applied black, red or brown printing ink, or ink of other suitable colour, to form lines 13 bounding and defining the data-indicating positions 14. It will be understood, therefore, that the data-indicating positions consist of small unobscured light-reflecting areas, each such area being so selected that it is capable of reflecting light of a predetermined intensity sufficient to actuate a given photo-electric cell. If desired, provided that a light-reflecting ink is used, a number or other identification character may be printed on a light-reflecting area of the card.

Data is recorded manually on the card by an operator partly or wholly obscuring the desired data-indicating position, as indicated by marks 15, Fig. 2, by using substantially non-light-reflecting media such as a black lead pencil, crayon or other marking instrument, or an instrument of other suitable marking colour, so that the area of the data position capable of reflecting light is reduced.

In order that the cards so marked may be employed to control known forms of statistical machines, such, for example, as sorters or tabulators, the marked data is duplicated in the card by perforations 16, Fig. 2, located in rows and columns as is customary in the art, and this is effected by the machine about to be described.

Referring to Figs. 3 to 9, a pile of marked cards is placed in a magazine 17, Figs. 3, 4 and 7 and are fed from the bottom of the pile one at a time by a picker 18 operated in well-known manner. Each card 10 as it is delivered from the magazine 17 has its leading edge engaged by a stop 19, Fig. 5, which locates one column 12 in a position for scanning.

The columns 12 are scanned in succession and to this end the stop 19 is advanced stepwise away from the magazine. The card 10 during scanning is disposed between a lower plate 20 and upper guides 21. The lower plate is provided with slots 121, Fig. 6, extending in the direction of movement of the card and through which project upstanding prongs formed on the stop 19 to engage the leading edge of the card.

The stop 19 is supported by a carriage 119 reciprocable along guides 122, Fig. 6, by a scanning cam 22 on the main shaft 23 of the machine and the stop 19 is mounted for vertical sliding movement relative to the carriage against the action of springs 123. During a scanning operation the stop 19 is in raised position as shown in Fig. 6 to locate the leading edge of a card but as it approaches the end of its stepwise movement the sloping portion 124 of a slot 125 in the stop is engaged by a fixed cam 126 which lowers the stop, as shown in Fig. 5, out of the path of the card. When the stop is lowered an abutment 127 thereon is engaged by a latch 128 pivoted at 129 to the carriage 119 and urged by a spring 130 towards the abutment. The latch retains the stop in its lowered position while the carriage returns the stop to starting position and as the stop approaches the position at which it is to be engaged by the leading edge of the next card a tail 131 on the latch is engaged by a fixed trip member 132 which trips the latch out of engagement with the abutment 127 thereby permitting the stop 19 under the action of spring 123 to rise to card engaging position.

The cam 22 operates an arm 31 pivoted to a lever 32 secured to a spindle 33, Fig. 7, to which is also secured a pair of arms 34 arranged to reciprocate a slide 35 to which the stop carriage 119 is connected by members 36.

The scanning apparatus comprises two sources of light consisting of lamps 37, Figs. 3 and 4, so disposed as to direct light on to the scanning position and the front glasses 137 of the lamps are ribbed in the known manner of anti-dazzle lamps. The glasses are, however, so disposed in the lamps as to be turned through ninety degrees relative to the position they occupy in anti-dazzle lamps so that light is directed by them on to a card in a manner such that a strip of light of high intensity is applied to a card in scanning position, the width of the strip of light being slightly greater than the width of a card column in scanning position. Light striking the data-indicating positions 14 in scanning position is reflected upwards from the unobscured portions thereof to a lens system 38 which receives an image of the column being scanned and by which the reflected light is directed to the lower ends of plastic refractive elements 39 arranged to guide or deflect the reflected light to photoelectric cells 40 disposed adjacent the opposite ends of the refractive elements 39. One element 39 and one cell 40 is provided for association with each data-indicating position 14 in a column 12.

The cells 40 are arranged to be energised on receipt of a light signal of predetermined magnitude so that if no data-position is marked as at 15 all the cells function. If, however, a mark 15 is sensed the intensity of light reflected from the position 14 containing the mark will be insufficient to cause functioning of the associated cell 40.

Between the elements 39 and the cells 40 is a shutter 41, Figs. 4 and 7, actuated by a bell-crank 42, link 43 and cam 44 on main shaft 23. The shutter 41 is operated in timed relation with the stop 19 so that when a card is arrested in scanning position by the stop the shutter is moved to expose the upper ends of the elements 39 to the cells 40.

The refractive elements 39 are made of transparent poly methyl meth-acrylate, preferably of the kind known as "Perspex," and each refractive element is preferably of substantially square cross-section and is disposed with the ends thereof nearest the lens system 38 closely adjacent one to the other. The photo-electric cells 40 cannot be disposed in such a confined space, however, and each of the refractive elements is suitably curved so that the ends thereof are out of alignment one with the other and one is adjacent the lenses while the other end is disposed beneath its associated photo-electric cell, as shown in Fig. 4.

The curves of the plastic refractive elements are such as to avoid loss of light as much as possible, and further to reduce such loss the outer surfaces of the refractive elements are wholly polished all over and all sharp edges are removed. Further, the refractive elements are disposed to be free from physical contact with any other substance. For example, if the refractive elements were to be painted or to be immersed in oil or water, some loss of light passing along the elements would occur due to physical adhesion of the paint, oil or water with the refractive element. If, however, the refractive elements are engaged by dry substances they will function in the manner desired because there is no true physical contact between dry material and the refractive elements.

The photo-electric cells 40 are connected by wires 45, Fig. 3, through an amplifier 46, and wires 47 one each to an electro-magnetic relay 48, the contacts of which are normally closed. The amplifier 46 amplifies the impulse received from the photo-electric cell.

When the whole of a card 10 has been sensed or scanned in the manner described above, the card is fed by feeding rollers 49, 50, Fig. 5, to a punching unit PU, Fig. 7, which punches in the card perforations representing the data sensed from the card.

The punch unit is of well-known construction and includes a vertically reciprocable card chamber comprising upper and lower die members 51, 52, Fig. 11, a vertically reciprocating stop 53 operated from a cam, not shown, on the main shaft 23, punches 54 and a set bar unit including transmission pins 55, Fig. 7, and set bars 56.

When a card is raised for punching, the punches 54, the set bars 56, and pins 55 are raised towards intermediate elements 57 and conditioning members 58, Fig. 9, urged upwards by springs 59 towards latches 60 pivoted at 61 to axially slidable members 62. The pins 58 normally engage the latches 60 so that the upper ends thereof are engaged by the side faces of vertically movable bars 63. The bars 63 are carried by a vertically reciprocable frame 163, Fig. 7, from which depend slide elements 164 slidable in bearings 165. The lower ends of the slide element 164 are engaged by arms 166 pivoted at 167 and the arms 166 are rocked by an arm 168 carried by a link 169 operated by a cam 170 on a shaft 26 driven by a gear 27 meshing with a gear 28 on main shaft 23.

To condition a set bar for punching there is provided for each column of punches a selecting finger 64 pivoted at 65 to one end of a lever 66 which is pivoted at 67 to a support 68 fixed to a carriage 69 common to the selecting apparatus for all the columns of punches.

The lever 66 carries a bell crank 71 one arm of which is connected by a link 72 to arms of two other bell cranks 73, the other arms of the three bell cranks being connected by a link 74.

The carriage 69 is reciprocable in guides 75, Fig. 7, and is reciprocated by a member 76, lever 77 and cam 78 on shaft 26 so that the fingers 64 are moved over the tops of the members 62 and selection of a member 62 to condition an intermediate element 57 is effected by an actuating electro-magnet 79 of which one is provided for each finger 64. Each magnet 79 has a moving armature 80 pivoted at 81 and actuates a plunger 82 against the action of a spring 83. The magnet 79 is momentarily energised by an amplified impulse from the amplifier 46 via a relay 48 and lines 148, Fig. 3, so that as the finger 64 passes over the appropriate member 62, the linkage 72, 73, 74, 71 is operated by the plunger 82 and that member 62 is depressed by the finger 64 to move its latch 60 beneath the corresponding bar 63. When the carriage has completed its movement to the left as viewed in Fig. 9, the frame 163 with bars 63 is moved downwards so that any latches 60 which have been positioned beneath their associated bars 63 are moved downwards thereby to condition their associated members 58 for a punching operation.

The relays 48 each have a swinging armature 84 held normally in the position shown in Fig. 8 by a spring 85 and the contacts of the relay are normally closed. The contacts are opened each time a column 12 of a card is arrested in scanning position by the stop 19, this being effected on opening of the shutter 41 owing to the coil of the relay being energised if in the scanning there is an unmarked data-indicating position on the column of the card in scanning position. Thus all the relays 48 are simultaneously conditioned so that the amplified impulse transmitted to one of them from the amplifier relays current to energise the appropriate electro-magnet 79, and thereby effect opening of its contacts. If, however, a mark is sensed as a result of a scanning operation the appropriate relay 48 will not be conditioned and its contacts will remain closed so that when a rotary switch 86, Fig. 8, is actuated an electrical impulse is relayed to the appropriate electro-magnet 79 along leads 148, Figs. 3 and 8.

When a punching operation has been effected the actuated latches 60 are restored simultaneously by a restoring plate 87 which is moved to the right, as viewed in Fig. 9, by a lever 88, Fig. 8, operated by a link 89 and cam 90, Fig. 7, on shaft 26.

The card illustrated in Figs. 1 and 2 is provided with nine columns 12 and it is intended that one mark shall always be made in each column. Consequently when the card is punched there should be one perforation in each of nine corresponding columns. To check that there is one perforation in each of the nine columns in which punching is effected there is provided a checking device about to be described.

The punched card is moved out of the card chamber 51, 52 by feed rollers in the known manner and is delivered in to a vertically reciprocable sensing chamber 91, Fig. 8, which, in known manner, has sensing pins 92, and transmission rods 93 associated therewith. The upper end of each rod 93 supports a cylindrical contact element 94 comprising integral conductor elements 95, 96, having their contact faces separated by contiguous insulator ring elements 97.

The contact elements 94 pass through a conductor plate 98 supported by insulating elements 99 carried by side frames 100 and are urged towards the rods 93 by springs 101. Fixed contact elements 102 comprising leaf springs depend from a plate 103 formed from insulating material, the plate 103 being supported by the frames 100. The upper ends of the contacts 102 are provided with terminals 104 while the lower ends of the contacts normally engage the insulator elements 97.

The terminals 104 are connected with a solenoid 105, Fig. 10, through resistances 106, the contacts of relays 107 and, as can be seen from Fig. 10, the electrical circuit is a self contained circuit fed from a source 108. The circuit is closed by a switch 109, Fig. 10, operated when the sensing chamber 91 is in its raised position and is open when the contact elements 102 cross the joints between the conductor elements 95 and the insulating elements 99.

It will be understood that the circuit includes a column of elements 94 for each card column to be sensed but in Fig. 10 only three columns have been shown to illustrate the three conditions which can occur. In the upper column, Fig. 10, it will be seen that a hole has been sensed in the No. 5 position thus indicating that only one hole is punched in that column of the card. This places the appropriate resistance 106 in series with the relay 107 so that the relay switch contact 110 is open and the solenoid 105 is not energised.

In the centre column no holes have been sensed in the card and the resistances 106 are short-circuited so that the relay switch contact 110 is closed and the solenoid 105 is energised.

In the lower column two holes representing Nos. 4 and 7 have been sensed thus placing two resistances 106 in parallel thereby halving the resistance so that again the relay switch contact 110 is closed and solenoid 105 is energised.

The solenoid 105 actuates a timing device 111, Fig. 8, of known construction, the construction and mode of operation of the timing device being as described in United States Patent specification No. 2,034,010, which in turn actuates a lever 112 secured to a spindle 113, Figs. 7 and 8, on which is mounted a deflector 213 disposed above a reject receiver pocket 114. When the testing devices determines that there is one perforation in each of the nine sensed columns the deflector 213 is in its horizontal position and the card on being released from the sensing chamber 91 is fed over the deflector and is delivered into a receiver pocket 115. If, however, the testing device determines that in one or more of the sensed columns there is no hole, or that there is more than one hole, the solenoid 105 operates the timing device 111 so that the deflector 213 is raised and deflects the defective card into the reject receiver 114.

In Figs. 1 and 2 the light reflecting areas forming data-indicating positions 14 have been shown as of square shape but it will be readily understood that these areas may be of other shapes, for example they may be oblong or circular, and they may be applied to a selected field of card which, otherwise, is of the form commonly in use prior to the present invention.

It is to be understood that although in the foregoing description, the machine described is one in which the marked data sensed from the selected card field is punched in a further field or fields of the card, the machine may, if desired, be so constructed that the data so sensed is punched in a different card fed to the punching unit in timed relation with the feeding of the data bearing card to the sensing or scanning mechanism described herein.

It will also be understood that, if desired, instead of the amplified impulses from the photo-electric cells being employed to condition the set bars in a punch unit, the impulses may be employed to initiate the control of functions of other forms of statistical machine. For example, the impulses may be employed to control functions of a sorting machine or of a tabulating machine.

I claim:

1. Apparatus for sensing data recorded on a statistical record card by the reduction of the light-reflecting property of data-indicating positions thereon, comprising a plurality of photo-electric cells corresponding to predetermined data-indicating positions on a record card, means to feed a card to a scanning position, a card stop to arrest a card in successive row or column scanning positions, a reciprocable carriage by which said card stop is supported for movement into and out of the path of a card, a retract cam to retract the card stop out of the path of a card at the end of a scanning operation, a latch to retain the stop in retracted position, a cam to move said carriage stepwise during a scanning operation and to return the carriage with the retracted stop with a continuous movement to the position at which the stop is first to be engaged by a card, an abutment to release said latch from the stop so that the stop is permitted to move into the path of a card for engagement thereby, a source of light to illuminate data-indicating positions located in the scanning position, a lens system and plastic refractive elements to guide or deflect light reflected from unobscured data-positions to the photo-electric cells appropriate thereto, a shutter operable in timed relation with the card locating means to obturate the photo-electric cells except when a card is arrested in position for scanning, an electrical relay for each said photo-electric cell and having normally closed contacts, and amplifiers to relay amplified electric impulses transmitted from the photo-electric cells to effect activation of the coils of said relays and thereby to open the contacts of the relays.

2. A record card controlled statistical machine comprising a set bar unit including intermediate elements, a plurality of photo-electric cells corresponding to predetermined data-indicating positions on a record card, means to feed a card to a scanning position, a card stop to arrest a card in successive row or column scanning positions, a reciprocable carriage by which said card stop is supported for movement into and out of the path of a card, a retract cam to retract the card stop out of the path of a card at the end of a scanning operation, a latch to retain the stop in retracted position, a cam to move said carriage stepwise during a scanning operation and to return the carriage with the retracted stop with a continuous movement to the position at which the stop is first to be engaged by a card, an abutment to release said latch from the stop so that the stop is permitted to move into the path of a card for engagement thereby, a source of light to illuminate data-indicating positions located in the scanning position, a lens system and plastic refractive elements to guide or deflect light reflected from unobscured data-positions to the photo-electric cells appropriate thereto, a shutter operable in timed relation with the card locating means to obturate the photo-electric cells except when a card is arrested in position for scanning, an electrical relay for each said photo-electric cell and having normally closed contacts, amplifiers to relay amplified electric impulses transmitted from the photo-electric cells to effect activation of the coils of said relays and thereby to open the contacts of the relays, electro-magnets to effect conditioning of the set bar unit, switch means operable in timed relation with the card feeding and locating means to permit an electric impulse to pass through the closed contacts of an unactivated relay to the electro-magnet associated therewith, bars mounted for reciprocation towards and away from the set bar unit in timed relation with said card feeding means, axially slidable conditioning members to actuate said intermediate elements, axially slidable members, latches supported by said axially slidable members and normally retained thereby in inactive relation to said bars and in engagement with said conditioning members, selecting fingers to engage said slidable members and move the latches into active relation with said bars, a reciprocable carriage for said fingers, means connecting said fingers and electro-magnets whereby on actuation of an electro-magnet the finger connected thereto is actuated to render a selected latch active, and a restoring plate operable in timed relation with said bars to effect restoration of active selecting fingers to their inactive positions.

3. A record card controlled machine comprising a plurality of columns of selectively operable selector members supported for lengthwise movement to and from normally inactive positions thereof, a conditioning member for each selector member and supported for lengthwise movement thereby, a normally inactive latch coupling each selector member with its conditioning member, a selector finger for each column of selector members to effect movement of a selector member from its inactive position to an active position thereof at which its latch is rendered operative to retain it in said active position, a reciprocable selector finger supporting carriage to move the selector fingers lengthwise of the columns of selector members with which they co-operate, finger actuating means connecting each selector finger to said supporting carriage for independent pivotal movement relative thereto to effect lengthwise movement of a selector member, an actuating electromagnet co-operating with each finger actuating means to effect said pivotal movement of the selector finger operable thereby, an electrical relay connected with each said electromagnet to effect actuation thereof, a restoring member operable in timed relation with said supporting carriage and co-operating with the selector fingers to render inactive fingers which have been moved to the active positions thereof, a card scanning device electrically connected with said relays and operable through an amplifier to control actuation of said electromagnets in accordance with data marked on a record card presented to the scanning device, and card feeding means operable in timed relation with said supporting carriage to move a card to and past the scanning device.

4. A machine according to claim 3, including a card stop to arrest a card in successive row or column scanning positions, a reciprocable stop-supporting carriage by which said card stop is supported for movement into and out of the path of a card, a retracted cam to retract the card stop out of the path of a card at the end of a scanning operation, a latch to retain the stop in the retracted position thereof, a cam operable in timed relation with said finger supporting carriage to move the stop-supporting carriage stepwise during a scanning operation and to return it with the retracted stop with a continuous movement to the position at which the stop is first to be engaged by a card, and an abutment to release said latch from the stop so that the stop is permitted to move into the path of a card for engagement thereby.

References Cited in the file of this patent

UNITED STATES PATENTS

| Number | Name | Date |
|---|---|---|
| 1,962,732 | Bryce et al. | June 12, 1934 |
| 1,982,216 | Lowkrantz | Nov. 27, 1934 |
| 1,991,516 | Paris | Feb. 19, 1935 |
| 2,150,256 | Warren | Mar. 14, 1939 |
| 2,224,764 | Dickinson | Dec. 10, 1940 |
| 2,240,546 | Bryce | May 6, 1941 |
| 2,275,396 | Johnson | Mar. 3, 1942 |